(12) United States Patent
Matsui

(10) Patent No.: US 9,744,892 B2
(45) Date of Patent: Aug. 29, 2017

(54) VEHICLE SEAT FRAME

(71) Applicants: TOYOTA BOSHOKU KABUSHIKI KAISHA, Aichi-ken (JP); AISIN SEIKI KABUSHIKI KAISHA, Aichi-ken (JP)

(72) Inventor: Hayato Matsui, Aichi-Ken (JP)

(73) Assignees: TOYOTA BOSHOKU KABUSHIKI KAISHA, Aichi-Ken (JP); AISIN SEIKI KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/217,256

(22) Filed: Jul. 22, 2016

(65) Prior Publication Data
US 2017/0028890 A1   Feb. 2, 2017

(30) Foreign Application Priority Data
Jul. 31, 2015 (JP) ................. 2015-151674

(51) Int. Cl.
| B60N 2/12 | (2006.01) |
| B60N 2/16 | (2006.01) |
| B60N 2/18 | (2006.01) |
| B60N 2/68 | (2006.01) |

(52) U.S. Cl.
CPC ..................... B60N 2/68 (2013.01)

(58) Field of Classification Search
CPC ....................................... B60N 2/68
USPC ............ 297/344.15, 344.16, 344.17, 452.18, 297/452.2; 248/421
See application file for complete search history.

(56) References Cited

U.S. PATENT DOCUMENTS

| 6,666,508 B1 * | 12/2003 | Hofmann ............. B60N 2/4214 297/344.15 X |
| 7,278,686 B2 * | 10/2007 | Yoshida ................. B60N 2/165 297/344.15 X |
| 7,316,454 B2 * | 1/2008 | Yoshida ................. B60N 2/165 297/344.15 X |
| 9,027,993 B2 * | 5/2015 | Munemura ........ B60N 2/42754 297/344.15 X |
| 2015/0097404 A1 * | 4/2015 | Furuta ..................... B60N 2/68 297/344.15 |

FOREIGN PATENT DOCUMENTS

| JP | 2007-168622 | 7/2007 |
| JP | 2012-254777 | 12/2012 |

* cited by examiner

*Primary Examiner* — Rodney B White
(74) *Attorney, Agent, or Firm* — Greenblum & Bernstein, P.L.C.

(57) ABSTRACT

A vehicle seat frame includes a pair of side frames, a pair of cylindrical collar members, a pair of link members, and a pipe member coaxially secured at end portions to the collar members. At least one of the collar members is substantially equal in outer diameter to the pipe member. A contact surface portion having a reduced outer diameter is formed in an end portion of a first member, which is brought into contact with a second member. The first member is one of the pipe member and the collar member that is substantially equal in outer diameter to the pipe member, and the second member is the other one of them. The first member and the second member are secured to each other by welding, with the contact surface portion kept in contact with an inner peripheral portion of the second member.

4 Claims, 4 Drawing Sheets

VEHICLE SEAT FRAME

INCORPORATION BY REFERENCE

The disclosure of Japanese Patent Application No. 2015-151674 filed on Jul. 31, 2015 including the specification, drawings and abstract is incorporated herein by reference in its entirety.

BACKGROUND OF THE INVENTION

1. Field of the Invention

The invention relates to a vehicle seat frame.

2. Description of Related Art

Some vehicle seats are provided with a lifter device configured to adjust the height of a seat cushion. As illustrated in FIG. 4 and FIG. 5, in a lifter device described in Japanese Unexamined Patent Application Publication No. 2012-254777 (JP 2012-254777 A), a side frame 11 of a seat cushion, a front link 12, an upper rail 62 of a slide rail 61, and a rear link 13 constitute a four-bar linkage mechanism. A right rear lifter mechanism includes a collar 14 having a cylindrical portion 14a and a flange 14b. The cylindrical portion 14a of the collar 14 is passed through a through-hole of the rear link 13 and secured to the rear link 13 by welding. The outer peripheral surface of a portion of the cylindrical portion 14a of the collar 14, the portion being protruded from the through-hole of the rear link 13, is in sliding contact with the peripheral surface defining a hole of the side frame 11, and is prevented from coming off by a push nut 15, so that the rear link 13 is held so as to be rotatable with respect to the side frame 11. One end portion of a rear pipe 17 having an outer diameter that is slightly smaller than the inner diameter of the collar 14 is inserted in a through-hole of the collar 14, and the outer peripheral surface of the rear pipe 17 and the collar 14 are secured to each other by welding. A pinion gear 16 rotatably attached to the side frame 11 is meshed with a sector gear provided in the rear link 13. As the pinion gear 16 is rotated, the rear link 13 pivots in the front-rear direction about a shaft 63 attached to the upper rail 62, so that the side frame 11 moves up and down via the collar 14. At this time, the front link 12 moves in accordance with the movement of the rear link 13, so that the side frame 11 moves up and down while the side frame 11 is kept substantially parallel to the slide rail 61.

In a technology described in JP 2012-254777 A, the outer diameter of the rear pipe 17 that couples the right and left collars 14 to each other is smaller than the outer diameter of each collar 14. In order to avoid a shortage of the torsional strength of a welded spot where the collar 14 and the rear pipe 17 are secured to each other by welding and a shortage of the bending strength of the rear pipe 17, the rear pipe 17 needs to have a large wall thickness. This increases the weight of the rear pipe 17.

SUMMARY OF THE INVENTION

The invention provides a vehicle seat frame including a light-weight and high-strength lifter mechanism.

An aspect of the invention relates to a vehicle seat frame including a pair of side frames, a pair of collar members, a pair of link members, and a pipe member. The side frames constitute side portions of a seat cushion frame. The collar members have a cylindrical shape. The collar members are rotatably attached to the respective side frames. Each of the link members has a first end portion secured to a corresponding one of the collar members, and a second end portion pivotably attached to a vehicle body. The pipe member is coaxially secured at respective end portions to the collar members. At least one of the collar members has an outer diameter that is substantially equal to an outer diameter of the pipe member. A contact surface portion having a reduced outer diameter is formed in an end portion of a first member. The end portion of the first member is brought into contact with a second member. The first member is one of the pipe member and the collar member that is substantially equal in outer diameter to the pipe member, and the second member is the other one of the pipe member and the collar member that is substantially equal in outer diameter to the pipe member. The first member and the second member are secured to each other by welding, with the contact surface portion kept in contact with an inner peripheral portion of the second member.

According to the above aspect, the pipe member is coupled to the collar members at least one of which has an outer diameter substantially equal to the outer diameter of the pipe member. Thus, a weld, at which the pipe member and the collar member that is equal in outer diameter to the pipe portion are secured to each other, is provided near an outer peripheral portion of collar member and an outer peripheral portion of the pipe member, and is apart from the central axis of the pipe member. This contributes an increase in the torsional strength. Further, the bending strength is increased by setting the outer diameter of the pipe member substantially equal to that of the collar member. As a result, it is possible to prevent an increase in the wall thickness of the pipe member while maintaining the strength of a lifter mechanism, thereby achieving weight reduction.

In the above aspect, the contact surface portion may be a sloped surface portion having an outer diameter that is gradually reduced.

Because the contact surface portion is a sloped surface portion having an outer diameter that is gradually reduced, the contact surface portion is easily brought into contact with the inner peripheral portion of the second member.

In the above aspect, the sloped surface portion of the first member may be brought into contact with the inner peripheral portion of the second member, and an end corner portion of the inner peripheral portion of the second member may be chamfered.

The sloped surface portion and the chamfered portion are brought into surface contact with each other, that is, a contact portion of the collar member and a contact portion of the pipe member are brought into substantially surface contact with each other. Thus, a high weld strength is achieved.

In the above aspect, the end corner portion of the inner peripheral portion of the second member may be chamfered at a chamfer angle of about 45 degrees, and the sloped surface portion may be sloped at an angle of about 45 degrees with respect to a central axis of the pipe member, in a section taken along a plane extending along the central axis of the pipe member.

Each of the chamfered portion and the sloped surface portion is sloped with respect to the central axis of each of the collar member and the pipe member at an angle of about 45 degrees. Thus, the pipe member and the collar member are brought into surface contact with each other. Thus, a higher weld strength is achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
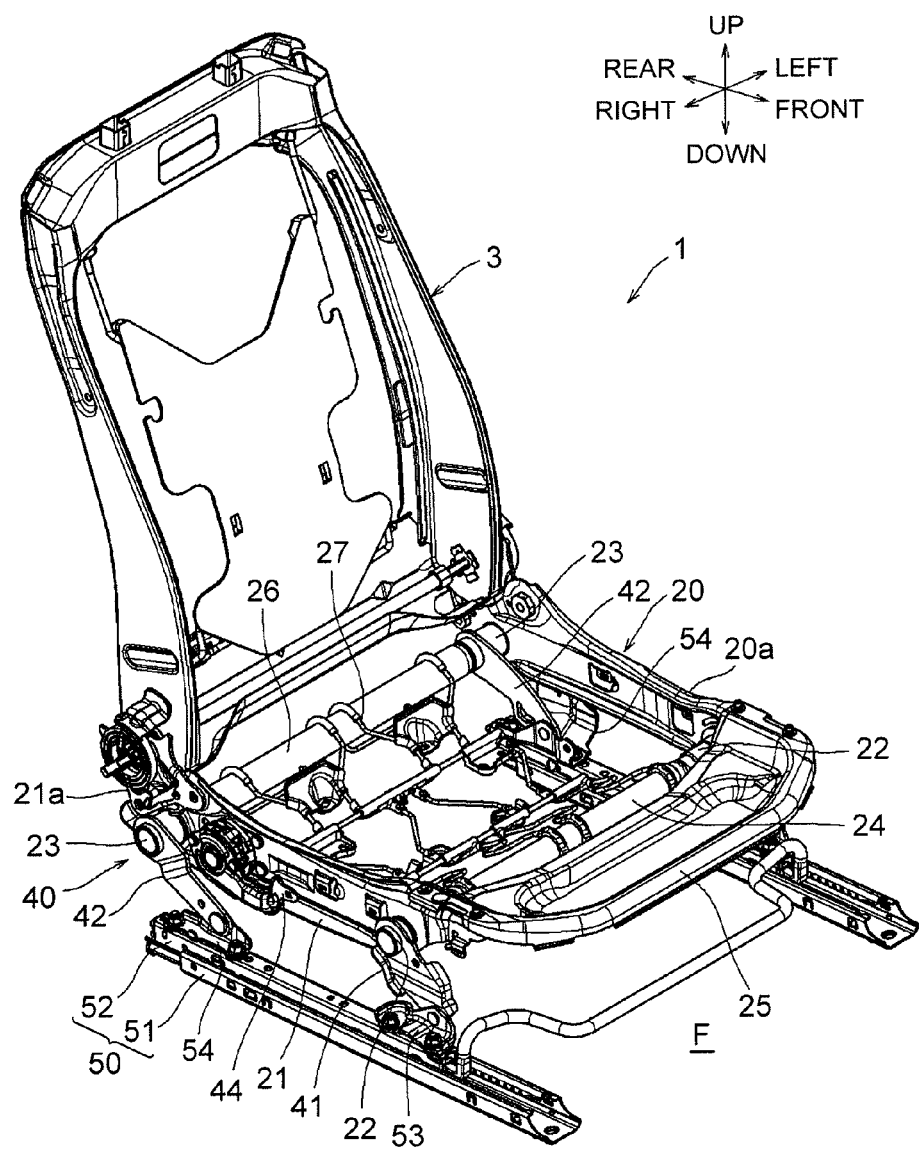
FIG. 1 is a perspective view of a vehicle seat frame according to an embodiment of the invention.
Figure 2:
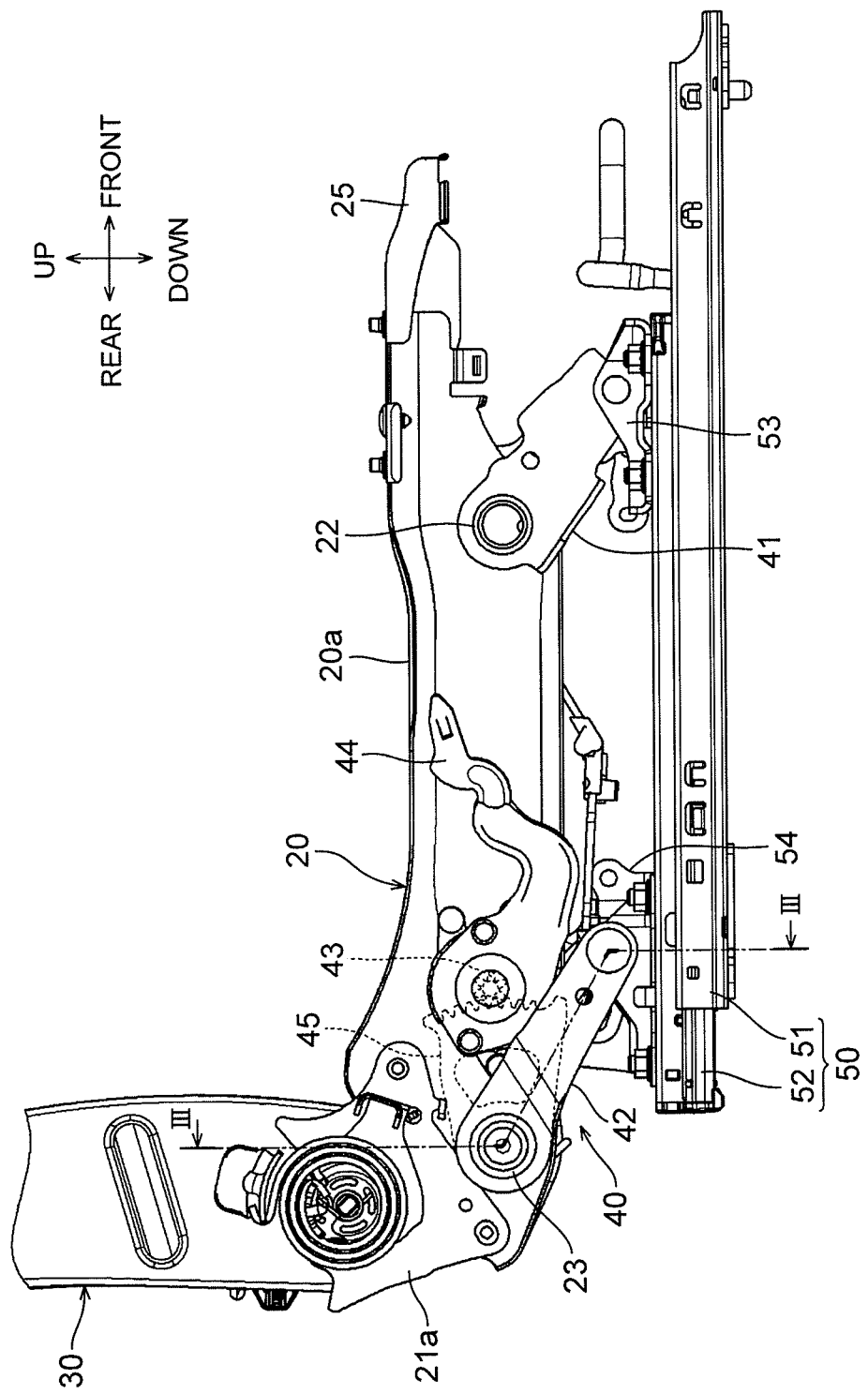
FIG. 2 is a side view of a lifter mechanism in the embodiment.
Figure 3:
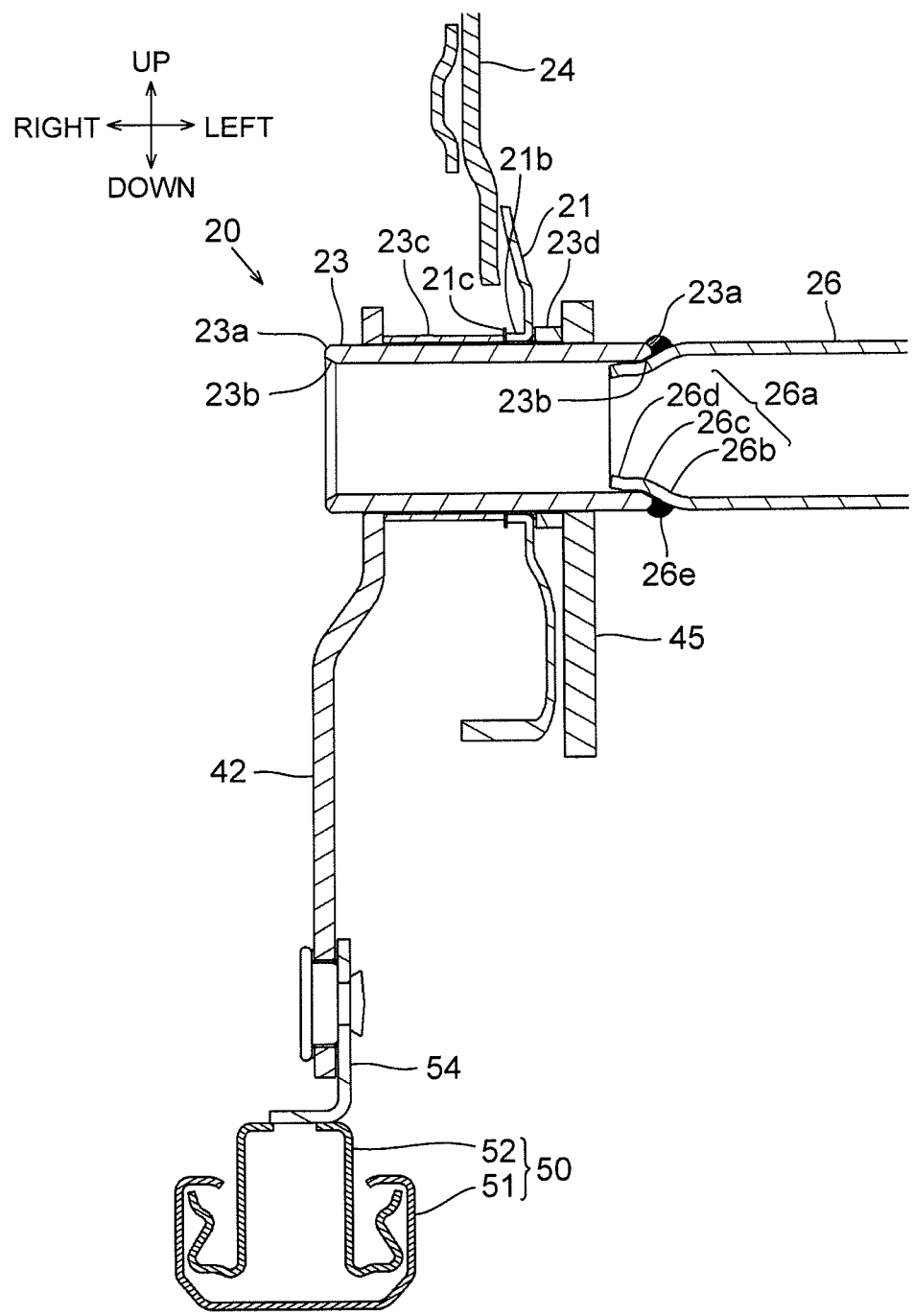
FIG. 3 is a sectional view taken along the line III-III in FIG. 2.
Figure 4:
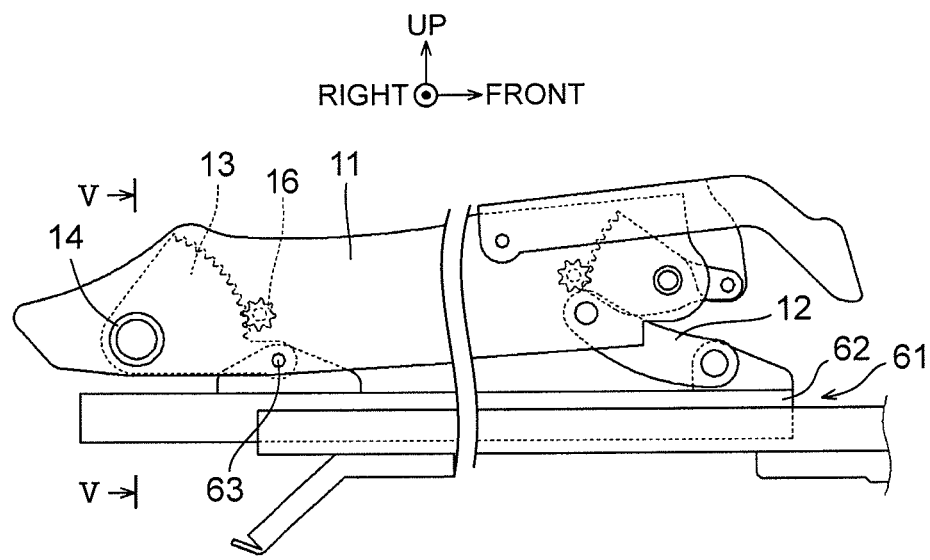
FIG. 4 is a side view of a seat cushion frame in related art.
Figure 5:
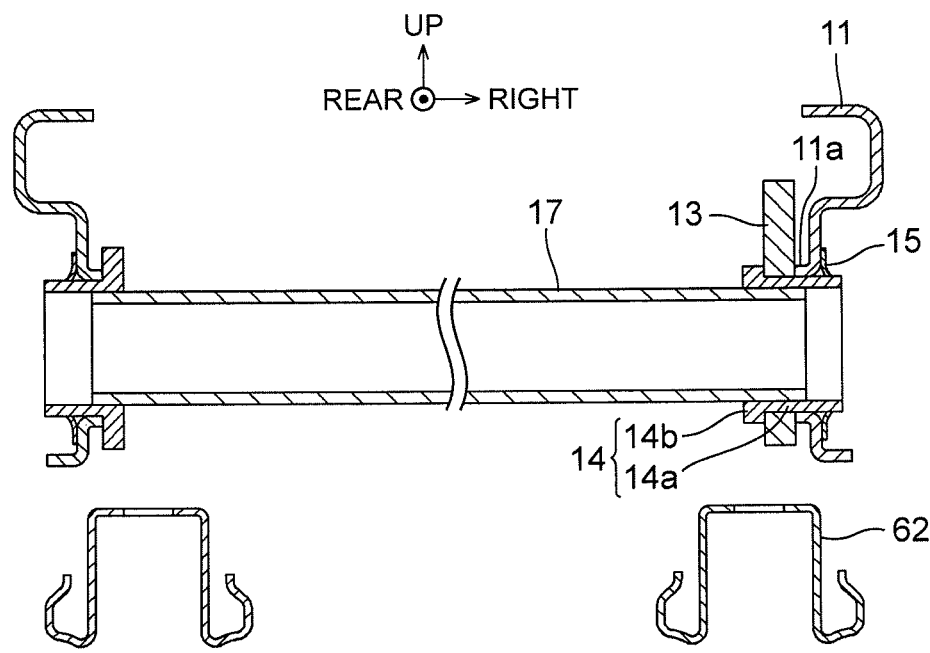
FIG. 5 is a sectional view taken along the line V-V in FIG. 4.

FIGS. 1 to 3 illustrate a vehicle seat frame according to an embodiment of the invention. FIGS. 1 to 3 illustrate the vehicle seat frame mounted in a vehicle, and arrows in the drawings indicate the directions with respect to the vehicle including the vehicle seat frame. In this specification, description relating to the directions will be provided with reference to the directions in the drawings. A vehicle seat frame 1 according to the present embodiment includes a seat cushion frame 20 and a seatback frame 3. A headrest frame is fitted to an upper portion of the seatback frame 3, but illustration of the headrest frame is omitted. The seatback frame 3 and the headrest frame have known configurations, and thus description thereof is omitted. The seat cushion frame 20 will be described in detail below. The vehicle seat frame 1 is an example of "vehicle seat frame".

As illustrated in FIG. 1, the seat cushion frame 20 includes a body 20a, a pair of slide rails 50, and a lifter mechanism 40. A cushion pad is disposed on the body 20a. The slide rails 50 are secured to a floor F so as to extend in the front-rear direction. The lifter mechanism 40 is configured to move the body 20a up and down with respect to the slide rails 50.

The body 20a includes a pair of side frames 21 extending in the front-rear direction. The side frames 21 are at the right and left sides of the body 20a. A front collar 22 having a cylindrical shape is rotatably attached to a front side portion of each side frame 21, and a rear collar 23 having a cylindrical shape is rotatably attached to a rear side portion of each side frame 21. Inside the seat frame, the right and left front collars 22 are coupled to each other via a front pipe 24 that is coaxial with the front collars 22. Further, inside the seat frame, the right and left rear collars 23 are coupled to each other via a rear pipe 26 that is coaxial with the rear collars 23. A front panel 25 is attached to front side portions of the side frames 21. Thus, the right and left side frames 21 are coupled to each other so as to face each other at a prescribed distance. In this way, the body 20a having a generally rectangular shape as viewed from above is provided. The rear collar 23 is an example of "collar member", and the rear pipe 26 is an example of "pipe member".

A zigzag spring 27 is attached to the front pipe 24 and the rear pipe 26 so as to be extended therebetween. The zigzag spring 27 supports the center and rear portions of the cushion pad from below. The zigzag spring 27 is a member formed by partially integrating springs, obtained by bending wires, together with resin. The zigzag spring 27 is hooked onto the front pipe 24 and the rear pipe 26 via resin members, thereby being held so as to be rotatable with respect to the front pipe 24 and the rear pipe 26. Thus, even when the front pipe 24 and the rear pipe 26 are rotated due to adjustment of the height of the seat cushion frame 20 performed by the lifter mechanism 40 (described later in detail), the engagement of the zigzag spring 27 with the front pipe 24 and the rear pipe 26 is maintained to stably support the cushion pad.

A reclining plate 21a is attached to a rear side portion of each side frame 21 with bolts and nuts. Right and left lower end portions of the seatback frame 3 are attached to the reclining plates 21a via a recliner (not illustrated). The angle of the seatback frame 3 with respect to the seat cushion frame 20 is adjusted by operating the recliner.

Each slide rail 50 includes a lower rail 51 and an upper rail 52. The lower rail 51 is secured to the floor F so as to extend in the front-rear direction. The upper rail 52 is slidably assembled to the lower rail 51. The slide rail 50 has a function of adjusting the position of the seat cushion frame 20 with respect to the floor F in the front-rear direction. A front bracket 53 is attached to a front end portion of each upper rail 52. The front bracket 53 supports a lower end portion of a front link 41 (described later in detail) such that the front link 41 is pivotable in the up-down direction. Further, a rear bracket 54 is attached to a rear end portion of each upper rail 52. The rear bracket 54 supports a lower end portion of a rear link 42 (described later in detail) such that the rear link 42 is pivotable in the up-down direction. The rear link 42 is an example of "link member".

As illustrated in FIG. 1 and FIG. 2, the lifter mechanism 40 includes a pair of the right and left front links 41, a pair of the right and left rear links 42, a pinion gear 43 and a lifter lever 44 that are operably attached to the right side frame 21, and a sector gear 45. Each of the right and left front links 41 is secured at its upper end portion to the front collar 22, and is supported at its lower end portion by the front bracket 53 so as to be pivotable in the up-down direction. Further, each of the right and left rear links 42 is secured at its upper end portion to the rear collar 23, and is supported at its lower end portion by the rear bracket 54 so as to be pivotable in the up-down direction. As illustrated in FIG. 3, the sector gear 45 is secured to a left end portion of the right rear collar 23 (i.e., an inner end portion of the right rear collar 23 in the seat lateral direction). The sector gear 45 is made of a steel sheet having a generally sector shape. The sector gear 45 has a toothed arc-shaped portion, and a main portion having a hole through which the rear collar 23 is passed. The sector gear 45 is disposed so as to be meshed with the pinion gear 43 operably attached to the right side frame 21. As the lifter lever 44 attached to the right side frame 21 is operated in the up-down direction, the pinion gear 43 rotates. In response to the rotation of the pinion gear 43, the right rear collar 23 rotates via the sector gear 45 and the right rear link 42 pivots in the up-down direction with respect to the rear bracket 54 attached to the upper rail 52. At the same time, the rotation of the right rear collar 23 is transmitted to the left rear collar 23 through the rear pipe 26, so that the left rear link 42 pivots in the up-down direction with respect to the rear bracket 54 attached to the upper rail 52. At this time, the right and left front links 41 pivot in the up-down direction in accordance with the movement of the right and left rear links 42. This is because the side frame 21, the front link 41, the upper rail 52, and the rear link 42 constitute a four-bar linkage mechanism on each of the right side and the left side. Thus, the seat cushion frame 20 moves up and down while the seat cushion frame 20 is kept substantially parallel to the floor F.

With reference to FIG. 3, a structure for attaching the rear link 42, the side frame 21, the sector gear 45, and the rear pipe 26 to the right rear collar 23 will be described in detail. The rear collar 23 is a cylindrical member made of steel. Further, an outer peripheral portion and an inner peripheral portion of each of both end portions of the rear collar 23 are chamfered at a chamfer angle of about 45°. Each outer peripheral portion of the rear collar 23 is chamfered at a chamfer angle of about 45° so as to have a chamfer dimension of about one-fourth of the wall thickness of a cylindrical portion of the rear collar 23. In this way, each outer peripheral portion of the rear collar 23 is turned into an outer periphery chamfered portion 23a. Further, each inner peripheral portion of the rear collar 23 is chamfered at a chamfer angle of about 45° so as to have a chamfer dimension of about half the wall thickness of the cylindrical portion of the rear collar 23. In this way, each inner peripheral portion of the rear collar 23 is turned into an inner periphery chamfered portion 23b. Such chamfering is performed on both the right and left end portions of the rear collar 23 (i.e., both the outer and inner end portions of the rear collar 23 in the seat lateral direction). A portion of the rear collar 23 close to its right end is fitted in a hole in an upper end portion of the rear link 42, and is secured to the rear link 42 by welding. A portion of the rear collar 23 close to its left end is fitted in a hole in a rear end portion of the sector gear 45, and is secured to the sector gear 45 by welding. A burring portion (flange) 21b of the side frame 21 is disposed on the rear collar 23, at a position between a portion to which the rear link 42 is attached and a portion to which the sector gear 45 is attached, such the burring portion 21b is provided with a bushing 21c having a surface subjected to a low-friction process, such as a fluororesin-coating process. A spacer 23d is disposed between the burring portion 21b of the side frame 21 and the sector gear 45. A spacer 23c, which is longer than the spacer 23d, is disposed between the burring portion 21b of the side frame 21 and the rear link 42. Thus, the rear collar 23 is rotatable with respect to the side frame 21. The bushing 21c is formed by subjecting one side of a thin metal sheet to a low-friction process, such as a fluororesin-coating process, such that the burring portion 21b is covered with the bushing 21c. The bushing 21c is formed such that the one side that has been subjected to a low-friction process, such as a fluororesin-coating process, is in contact with the rear collar 23, the spacer 23c, and the spacer 23d. The bushing 21c allows the side frame 21 to smoothly pivot with respect to rear collar 23, the spacer 23c, and the spacer 23d.

A right end portion of the rear pipe 26 (i.e., an outer end portion of the rear pipe 26 in the seat lateral direction) is butt-joined, by welding, to the left end portion of the rear collar 23 (i.e., the inner end portion of the rear collar 23 in the seat lateral direction). The rear pipe 26 is a cylindrical steel member having an outer diameter that is substantially equal to the outer diameter of the rear collar 23 and having a wall thickness that is about two-thirds of the wall thickness of the rear collar 23. A diameter-reduced portion 26a is formed, by swaging, in the right end portion of the rear pipe 26. The diameter-reduced portion 26a has three portions, that is, a first diameter-reduced portion 26b, a second diameter-reduced portion 26c, and a third diameter-reduced portion 26d that are arranged in this order from the center side of the rear pipe 26 toward the right end thereof in its longitudinal direction. The first diameter-reduced portion 26b is a portion having an outer diameter that is gradually reduced from the outer diameter of a main portion of the rear pipe 26 to an outer diameter substantially equal to the inner diameter of the rear collar 23. The outer diameter of the first diameter-reduced portion 26b is gradually reduced such that the outer peripheral surface of the first diameter-reduced portion 26b is sloped with respect to the outer peripheral surface of the main portion of the rear pipe 26 at an angle of about 45°, in a section taken along a plane extending through the central axis of the rear pipe 26 (i.e., a section illustrated in FIG. 3). The second diameter-reduced portion 26c is a portion extending rightward from the right end of the first diameter-reduced portion 26b, and having an outer diameter that is substantially equal to the inner diameter of the rear collar 23. The third diameter-reduced portion 26d is a portion extending rightward from the right end of the second diameter-reduced portion 26c. The outer diameter of the third diameter-reduced portion 26d is gradually reduced such that the outer peripheral surface of the third diameter-reduced portion 26d is sloped with respect to the outer peripheral surface of the second diameter-reduced portion 26c at substantially the same angle as the angle at which the outer peripheral surface of the first diameter-reduced portion 26b is sloped with respect to the outer peripheral surface of the main portion of the rear pipe 26 (i.e., at an angle of about 45°). When the diameter-reduced portion 26a of the rear pipe 26 is brought into contact with the rear collar 23, the third diameter-reduced portion 26d functions as a guiding portion that allows the rear pipe 26 to be brought into contact with the rear collar 23 coaxially. The first diameter-reduced portion 26b is an example of "contact surface portion", and is also an example of "sloped surface portion".

When the diameter-reduced portion 26a in the right end portion of the rear pipe 26 is brought into contact with the left end portion of the rear collar 23, the rear pipe 26 is positioned with respect to the rear collar 23, with an outer peripheral portion of the first diameter-reduced portion 26b of the rear pipe 26 kept in contact with the inner periphery chamfered portion 23b of the rear collar 23. In this state, a weld 26e is formed, by welding, between the left end portion of the rear collar 23 and the outer peripheral portion of the first diameter-reduced portion 26b of the rear pipe 26. As a result, the rear collar 23 and the rear pipe 26 are secured to each other. The rear pipe 26 is an example of "first member", and the rear collar 23 is an example of "second member".

A structure for attaching the rear link 42, the side frame 21, and the rear pipe 26 to the left the rear collar 23 is basically the same as the attachment structure on the right side, except that there is no sector gear 45 on the left side and the arrangement of the rear link 42 and the side frame 21 on the left side differs from that on the right side. This is because providing only one sector gear 45, that is the sector gear 45 on the right side, is enough to fulfill a function as a sector gear, and provision of a sector gear 45 on the left side is not necessary. Further, the arrangement of the rear link 42 and the side frame 21 differs between the right side and the left side because the arrangement of the slide rail 50 with respect to the seat cushion frame 20 differs between the right side and the left side. That is, the structure for coupling together the left rear collar 23 and the left end portion of the rear pipe 26 is the same as the structure for coupling together the right rear collar 23 and the right end portion of the rear pipe 26.

The foregoing embodiment produces the following advantageous effects. The right the rear collar 23 and the left the rear collar 23 are coupled to each other via the rear pipe 26 having an outer diameter substantially equal to the outer diameter of each rear collar 23. Further, the diameter-reduced portion 26a is formed in each end portion of the rear pipe 26, and the end portion of the rear collar 23 and the outer peripheral portion of the first diameter-reduced portion 26b are secured to each other by welding, with the outer peripheral portion of the first diameter-reduced portion 26b of the diameter-reduced portion 26a kept in contact with the end portion of the inner peripheral portion of the rear collar 23. Thus, the rear collar 23 and the rear pipe 26 are coupled to each other at a position radially apart from the central axis of each of the rear collar 23 and the rear pipe 26. As a result, the torsional strength and the bending strength in the up-down direction are increased. The strength of the lifter mechanism is increased by increasing the torsional strength, and the cushion pad is more reliably supported via the zigzag spring 27 by increasing the bending strength in the up-down direction. As a result, it is possible to prevent an increase in the wall thickness of the rear pipe 26, thereby providing the light-weight and high-strength seat cushion frame 20.

Further, the inner periphery chamfered portion 23b is formed in each end potion of the rear collar 23, and the first diameter-reduced portion 26b is formed in each end portion of the rear pipe 26. Then, welding is performed with the inner periphery chamfered portion 23b and the first diameter-reduced portion 26b kept in contact with each other. The inner periphery chamfered portion 23b is formed by chamfering the inner peripheral portion of the rear collar 23 at a chamfer angle of about 45°. Thus, the outer diameter of the first diameter-reduced portion 26b is gradually reduced such that the outer peripheral surface of the first diameter-reduced portion 26b is sloped with respect to the outer peripheral surface of the main portion of the rear pipe 26 at an angle of about 45°, in a section taken along a plane extending through the central axis of the rear pipe 26 Thus, the inner periphery chamfered portion 23b and the first diameter-reduced portion 26b are brought into surface contact with each other, so that they are more firmly secured to each other by welding.

While one embodiment of the invention has been described above, various changes and modifications may be made to the foregoing embodiment within the scope of the invention. For example, the following changes and modifications may be made to the foregoing embodiment.

In the foregoing embodiment, the diameter-reduced portion 26a of the rear pipe 26 has three portions, that is, the first diameter-reduced portion 26b, the second diameter-reduced portion 26c, and the third diameter-reduced portion 26d. Alternatively, the diameter-reduced portion 26a may have only the first diameter-reduced portion 26b, or may have only the first diameter-reduced portion 26b and the second diameter-reduced portion 26c. Further alternatively, the diameter-reduced portion 26a of the rear pipe 26 may have a shape obtained by extending an outer end portion of the first diameter-reduced portion 26b (i.e., an outer end portion of the first diameter-reduced portion 26b in the seat lateral direction) toward the central axis of the rear pipe 26 at the same slope angle of the first diameter-reduced portion 26b.

In the foregoing embodiment, The inner periphery chamfered portion 23b is formed by chamfering the inner peripheral portion of the rear collar 23 at a chamfer angle of about 45°. Alternatively, the chamfer angle may be changed. Further alternatively, chamfering need not be performed. In order to increase the weld strength, it is preferable to set the chamfer angle and the slope angle of the first diameter-reduced portion 26b of the rear pipe 26 equal to each other, thereby allowing the end portion of the rear collar 23 and the end portion of the rear pipe 26 to come into surface contact with each other.

In the foregoing embodiment, the right and left front links 41 and the right and left rear links 42 are attached to the floor F via the right and left slide rails 50, respectively. Alternatively, the right and left front links 41 and the right and left rear links 42 may be directly attached to the floor F.

In the foregoing embodiment, the diameter-reduced portion 26a is formed in the rear pipe 26, and the inner periphery chamfered portion 23b is formed in the rear collar 23. Alternatively, a diameter-reduced portion may be formed in the rear collar 23, and an inner periphery chamfered portion may be formed in the rear pipe 26.

In the foregoing embodiment, the invention is applied to the vehicle seat. Alternatively, the invention may be applied to seats mounted in aircrafts, vessels, trains, and the like.

What is claimed is:

1. A vehicle seat frame comprising:
   a pair of side frames constituting side portions of a seat cushion frame;
   a pair of collar members having a cylindrical shape, the collar members being rotatably attached to the respective side frames;
   a pair of link members, each of the link members having a first end portion secured to a corresponding one of the collar members, and a second end portion pivotably attached to a vehicle body; and
   a pipe member coaxially secured at respective end portions to the collar members, wherein
   at least one of the collar members has an outer diameter that is substantially equal to an outer diameter of the pipe member,
   a contact surface portion having a reduced outer diameter is formed in an end portion of a first member, the end portion of the first member being brought into contact with a second member,
      the first member being one of the pipe member and the collar member that is substantially equal in outer diameter to the pipe member, and the second member being the other one of the pipe member and the collar member that is substantially equal in outer diameter to the pipe member, and
   the first member and the second member are secured to each other by welding, with the contact surface portion kept in contact with an inner peripheral portion of the second member.

2. The vehicle seat frame according to claim 1, wherein the contact surface portion is a sloped surface portion having an outer diameter that is gradually reduced.

3. The vehicle seat frame according to claim 2, wherein:
   the sloped surface portion of the first member is brought into contact with the inner peripheral portion of the second member; and
   an end corner portion of the inner peripheral portion of the second member is chamfered.

4. The vehicle seat frame according to claim 3, wherein:
   the end corner portion of the inner peripheral portion of the second member is chamfered at a chamfer angle of about 45 degrees; and
   the sloped surface portion is sloped at an angle of about 45 degrees with respect to a central axis of the pipe member, in a section taken along a plane extending along the central axis of the pipe member.

* * * * *